(12) United States Patent
Bae et al.

(10) Patent No.: US 11,460,041 B2
(45) Date of Patent: Oct. 4, 2022

(54) TURBO COMPRESSOR

(71) Applicant: LG Electronics Inc., Seoul (KR)

(72) Inventors: Hyojo Bae, Seoul (KR); Junchul Oh, Seoul (KR); Seheon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 176 days.

(21) Appl. No.: 16/828,688

(22) Filed: Mar. 24, 2020

(65) Prior Publication Data
US 2020/0400160 A1 Dec. 24, 2020

(30) Foreign Application Priority Data

Jun. 24, 2019 (KR) .................. 10-2019-0075260

(51) Int. Cl.
| | | |
|---|---|---|
| *F04D 29/62* | (2006.01) | |
| *F04D 29/42* | (2006.01) | |
| *F04D 25/06* | (2006.01) | |
| *F04D 17/12* | (2006.01) | |
| *F04D 29/58* | (2006.01) | |

(52) U.S. Cl.
CPC ......... *F04D 29/4206* (2013.01); *F04D 25/06* (2013.01); *F04D 29/622* (2013.01); *F04D 17/122* (2013.01); *F04D 29/5806* (2013.01); *F05D 2220/3219* (2013.01); *F05D 2220/40* (2013.01); *F05D 2240/11* (2013.01); *F16C 2360/44* (2013.01); *F25B 2339/047* (2013.01); *F25B 2400/13* (2013.01)

(58) Field of Classification Search
CPC .... F04D 17/122; F04D 27/002; F04D 29/083; F04D 29/403; F04D 29/4206; F04D 29/622
See application file for complete search history.

(56) References Cited

U.S. PATENT DOCUMENTS

| | | | |
|---|---|---|---|
| 10,309,410 B2 * | 6/2019 | Ottow | .................. F04D 29/162 |
| 10,724,546 B2 * | 7/2020 | Morgan | ................ F04D 29/053 |
| 10,731,666 B2 * | 8/2020 | Skertic | .................. F04D 29/622 |
| 10,858,951 B2 * | 12/2020 | Hasegawa | ........... F04D 25/0606 |
| 2017/0342995 A1 | 11/2017 | Ottow et al. | |

FOREIGN PATENT DOCUMENTS

| | | | | |
|---|---|---|---|---|
| JP | H06272698 A | * | 9/1994 | ........... F04D 29/624 |
| JP | H11257293 A | * | 9/1999 | ........... F04D 29/444 |
| KR | 20160103226 | | 9/2016 | |
| KR | 20160130496 | | 11/2016 | |
| KR | 101731640 | | 5/2017 | |

OTHER PUBLICATIONS

Korean Notice of Allowance in Korean Application No. 10-2019-0075260, dated Jun. 23, 2020, 4 pages (with English translation).

* cited by examiner

*Primary Examiner* — Brian P Wolcott (74) *Attorney, Agent, or Firm* — Fish & Richardson P.C.

(57) ABSTRACT

Provided is a turbo compressor. The turbo compressor includes a driving shaft, a first impeller, a second impeller, a first shroud, a second shroud, a first-stage outflow passage, and a second-stage outflow passage. Also, the turbo compressor includes a gap adjustment passage that is branched from at least one of the first-stage outflow passage or the second-stage outflow passage to extend to the first shroud.

4 Claims, 10 Drawing Sheets

TURBO COMPRESSOR

CROSS-REFERENCE TO RELATED APPLICATIONS

The present application claims priority under 35 U.S.C. 119 and 35 U.S.C. 365 to Korean Patent Application No. 10-2019-0075260, filed on Jun. 24, 2019, in the Korean Intellectual Property Office, the disclosure of which is hereby incorporated by reference in its entirety.

BACKGROUND

The present disclosure relates to a turbo compressor.

In general, compressors are machines that receive power from a power generation device such as an electric motor or a turbine to compress air, a refrigerant, or various working gases, thereby increasing a pressure. Compressors are being widely used in home appliances or industrial fields.

Such a compressor includes a turbo compressor that compresses a fluid by applying a centrifugal force by using a vane wheel (impeller) rotating at a high speed to convert a portion of velocity energy into pressure energy. For example, the turbo compressor may be used in a chiller system. In general, the compressor used in the chiller system corresponds to a turbo compressor.

The chiller system represents a system that supplies cold water to a demand place. In detail, the chiller system cools cold water by heat-exchange between a refrigerant circulating in a refrigerant cycle and cold water circulating in the demand place. Particularly, the chiller system may be understood as being installed in a large building or the like as a relatively large capacity facility.

The turbo compressor includes a driving shaft and an impeller coupled to the driving shaft. Particularly, the turbo compressor includes a two-stage compression tube compressor provided with a first-stage impeller and a second-stage impeller coupled to both ends of the driving shaft. In detail, a refrigerant compressed by the first-stage impeller flows to the second-stage impeller so as to be compressed again.

Here, since the refrigerant compressed in the first-stage impeller is supplied to the second-stage impeller, the refrigerant existing at a second-stage impeller side may have a relatively high pressure. Thus, different pressures may be applied to both the ends of the driving shaft to cause a phenomenon in which the driving shaft is pushed toward a first stage.

Thus, an interference between components may occur, and particularly, an interference between the impeller and the shroud accommodating the impeller may occur. To solve the above-described limitation, the following prior art document 1 has been disclosed.

PRIOR ART DOCUMENT 1

1. Publication No.: US2017/0342995A1 (Date of Publication: Nov. 30, 2017)
2. Title of Invention: Segregated impeller shroud for clearance control in a centrifugal compressor In the prior art document 1, a turbo compressor that moves a shroud by using an actuator is disclosed. In detail, the shroud rotates in a circumferential direction by an operation of the actuator, and then, the shroud moves in an axial direction along a screw thread. Thus, a gap between the shroud and the impeller may be adjusted.

In the prior part document 1 as described above, a separate power device that is called the actuator has to be provided. Thus, an additional material cost is required, and a time required for manufacturing and assembly increases.

In addition, a separate shape such as the screw thread so as to move the shroud in the axial direction is necessary. Thus, the compressor may be complicated in configuration. Particularly, since the shroud rotates in the circumferential direction and moves in the axial direction, mechanical coupling and sealing designs may be complicated.

In addition, the gap between the shroud and the impeller may occur during the operation of the compressor. Thus, since the shroud has to move during the flow of the refrigerant, flow resistance may increase.

Also, a separate sensor device measuring the gap between the shroud and the impeller is required. This is done because the gap between the shroud and the impeller has to be known so as to drive the actuator.

SUMMARY

Embodiments provide a turbo compressor including a gap adjustment passage that supplies and moves a refrigerant compressed in an impeller to a first-stage shroud.

Embodiments also provide a turbo compressor that supplies a refrigerant having a high pressure, which is compressed in two stages to the first-stage shroud to reduce a gap between the first-stage shroud and the impeller, thereby improving efficiency.

Embodiments also provide a turbo compressor including a gap adjustment member that assists a gap adjustment passage to more effectively move the shroud.

In one embodiment, a turbo compressor includes a driving shaft, a first impeller and a second impeller, which are respectively coupled to both ends of the driving shaft, a first shroud configured to define a compression space in which the first impeller is disposed, a second shroud configured to define a compression space in which the second impeller is disposed, a first-stage outflow passage through which a refrigerant discharged from the first impeller flows, and a second-stage outflow passage through which a refrigerant discharged from the second impeller flows.

Also, the turbo compressor includes a gap adjustment passage that is branched from at least one of the first-stage outflow passage or the second-stage outflow passage to extend to the first shroud.

The turbo compressor may further include a first gap defined between the first impeller and the first shroud. The gap adjustment passage may be installed at one side of the first shroud so that the first shroud moves in a direction in which the first gap is narrowed by the refrigerant flowing to the gap adjustment passage.

The turbo compressor may further include a gap adjustment member coupled to the first shroud to allow the first shroud to move. The gap adjustment member may include an elastic member configured to apply an elastic force to the first shroud in a direction in which the first gap is widened.

The details of one or more embodiments are set forth in the accompanying drawings and the description below. Other features will be apparent from the description and drawings, and from the claims.

DETAILED DESCRIPTION OF THE EMBODIMENTS

Hereinafter, some embodiments of the present disclosure will be described in detail with reference to the accompanying drawings. It is noted that the same or similar components in the drawings are designated by the same reference numerals as far as possible even if they are shown in different drawings. In the following description of the present disclosure, a detailed description of known functions and configurations incorporated herein will be omitted to avoid making the subject matter of the present disclosure unclear.

In the description of the elements of the present disclosure, the terms first, second, A, B, (a), and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 1:
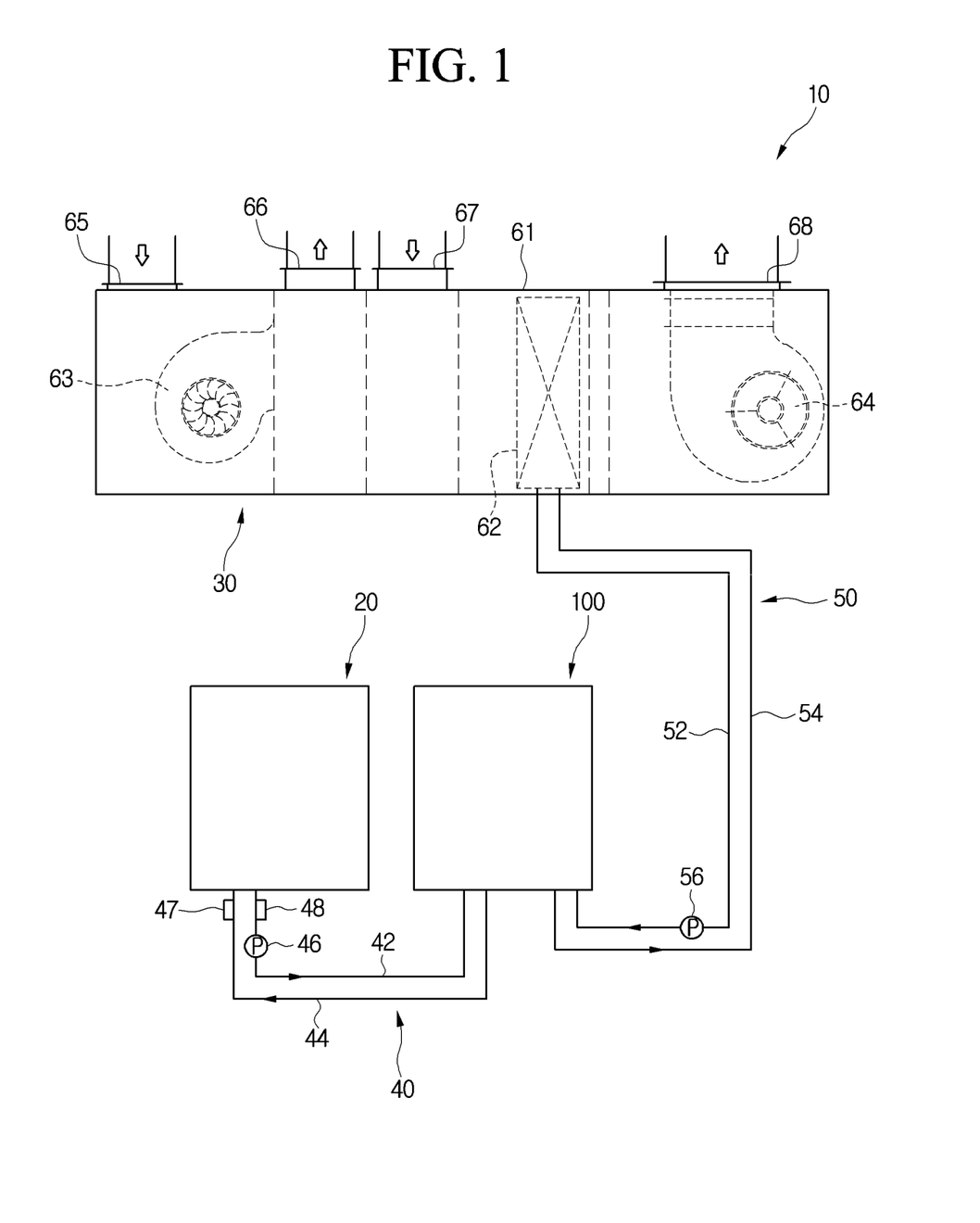
FIG. 1 is a view of a chiller system according to an embodiment.

FIG. 1 is a view of a chiller system according to an embodiment.

As illustrated in FIG. 1, a chiller system 10 according to an embodiment includes a chiller unit 100, a cooling tower 20, and a demand place 30.

The chiller unit 100 may be understood as a component in which a cooling cycle is provided. The chiller system 10 may be used in the same manner as the chiller unit 100. That is, the chiller unit 100 may be called the chiller system 10.

The cooling tower 20 may be a component that supplies cooling water to the chiller unit 100. Also, in the chiller system 10, a blower fan instead of the cooling tower 20 may be provided to be heat-exchanged with air. For example, the cooling top 20 may be installed in a chiller system having a relatively large size, and the blower fan may be installed in a chiller system having a relatively small size.

The demand place 30 may be a component in which the cool water heated-exchanged with the chiller unit 100 circulates. Here, the demand place 30 may be understood as a device or body space for conditioning air by using cold water.

A cooling water circulation passage 40 is disposed between the chiller unit 100 and the cooling tower 20. The cooling water circulation passage 40 may be a tube that guides the cooling water so that the cooling water is circulated through the cooling tower 20 and the chiller unit 100.

The cooling water circulation passage 40 may include a cooling water inflow passage 42 and a cooling water outflow passage 44. The cooling water inflow passage 42 may be a tube that guides the cooling water so that the cooling water is introduced into the chiller unit 100. Also, the cooling water outflow passage 44 may be a tube that guides the cooling water so that the cooling water heated in the chiller unit 100 flows to the cooling tower 20.

A cooling water pump 46 driven to allow the cooling water to flow may be provided in at least one of the cooling water inflow passage 42 or the cooling water outflow passage 44. For example, in FIG. 1, the cooling water pump 46 is provided in the cooling water inflow passage 42.

An outflow temperature sensor 47 for detecting a temperature of the cooling water introduced into the cooling tower 20 is disposed in the cooling water outflow passage 44. Also, an inflow temperature sensor 48 for detecting a temperature of the cooling water discharged from the cooling tower 20 is disposed in the cooling water inflow passage 42.

A cold water circulation passage 50 is provided between the chiller unit 100 and the cold water demand place 30. The cold water circulation passage 50 may be a tube that guides the cold water so that the cold water is circulated through the cold water demand place 30 and the chiller unit 100.

The cold water circulation passage 50 may include a cold water inflow passage 52 and a cold water outflow passage 54. The cold water inflow passage 52 may be a tube that guides the cold water so that the cold water is introduced into the chiller unit 100. The cold water outlet passage 54 may be a tube that guides the cold water so that the cold water cooled in the chiller unit 100 flows to the cold water demand place 30.

A cold water pump 56 that is driven to allow the cold water to flow may be provided in at least one of the cold water inflow passage 52 or the cold water outflow passage 54. For example, in FIG. 1, the cold water pump 56 is provided in the cold water inflow passage 52.

Here, the cold water demand place 30 may be a water cooling type air-conditioner in which air and cold water are heat-exchanged with each other.

For example, the cold water demand place 30 may include at least one unit of an air handling unit (AHU) in which indoor air and outdoor air are mixed with each other, and the mixed air is heat-exchanged with cold water to discharge the cooled air into an indoor space, a fan coil unit (FCU) disposed in the indoor space to heat-exchange the indoor air with the cold water, thereby discharge the cooled air into the indoor space, and a bottom tube unit buried in the bottom of the indoor space.

In FIG. 1, the cold water demand place 30 is provided as the AHU.

The cold water demand place 30 provided as the AHU may include a casing 61, a cooling water coil 62, and air blowers 63 and 64. The cold water coil 62 may be a component which is installed in the casing 61 and through which the cold water passes.

The air blowers 63 and 64 may be provided on both sides of the cold water coil 62 to suction indoor air and outdoor air and then blow the suctioned air to the inner space. The air blowers 63 and 64 may include a first air blower 63 and a second air blower 64. The first air blower 63 is installed so that the indoor air and the outdoor air are suctioned into the casing 61. Also, the second air blower 64 is installed so that the conditioned air is discharged to the outside of the casing 61.

Also, an indoor air suction part 65, an indoor air discharge part 66, an external air suction part 67, and a conditioned air discharge part 68.

When the air blowers 63 and 64 are driven, a portion of the air suctioned into the indoor air suction part 65 may be discharged to the indoor air discharge part 66. Also, remaining air that is not discharged to the indoor air discharge part 66 may be mixed with the indoor air suctioned to the external air suction part 67.

Also, the mixed air is heat-exchanged with the cold water coil 62. Also, the mixed air that is heat-exchanged or cooled with the cold water coil 62 may be discharged into the indoor space through the conditioned air discharge part 68. The conditioned air may be supplied to the indoor space to cool an indoor body space through the above-described processes.

Also, the cold water demand place 30 may correspond to a facility that directly uses the cold water. For example, the cold water demand place 30 may provide the cold water that is capable of reducing a temperature of a semiconductor component. Also, the chiller system 10 according to an embodiment may supply the cooling water to a hot water demand place instead of the cooling tower 20.

The chiller system 10 according to an embodiment may be provided as various constituents without being limited to the constituent of FIG. 1. That is, the constituents of the chiller system 10 may be merely an example and thus may be added, omitted, or modified.

Hereinafter, the chiller unit 100 will be described in detail.

Figure 2:
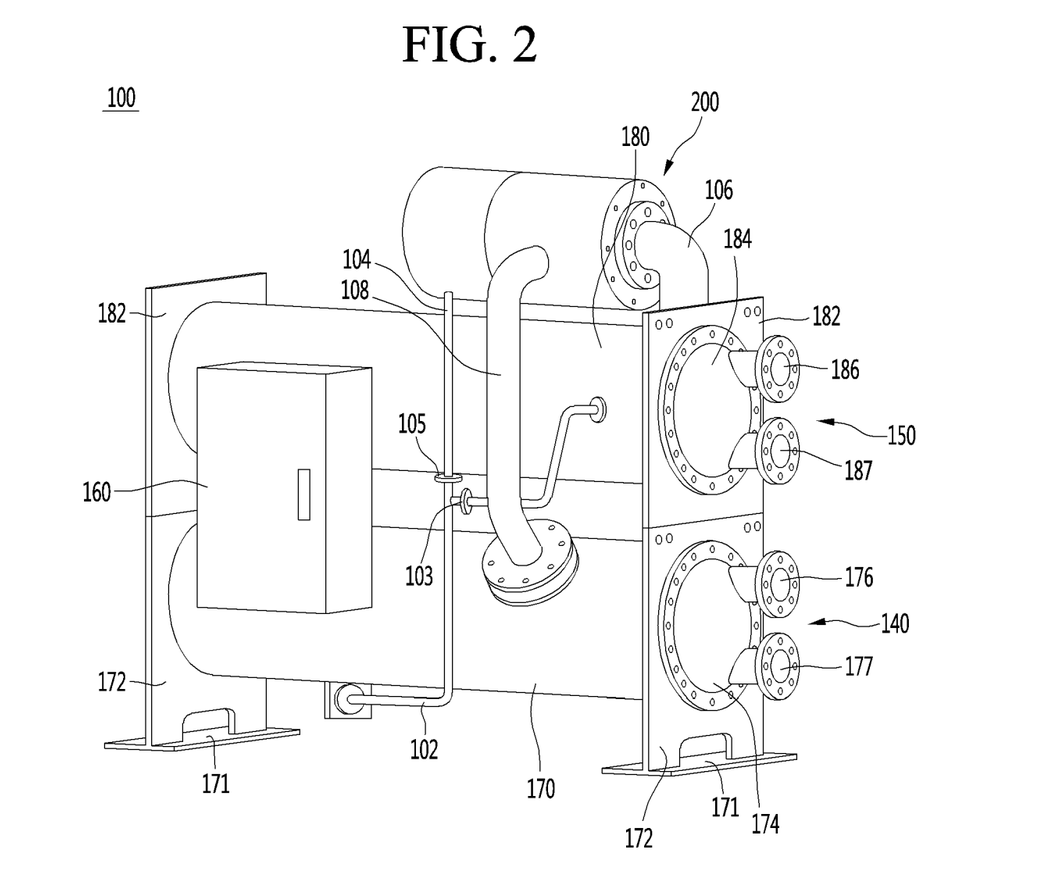
FIG. 2 is a schematic view illustrating a configuration of the chiller system in which a turbo compressor is installed according to an embodiment.

FIG. 2 is a schematic view illustrating a configuration of the chiller system in which a turbo compressor is installed according to an embodiment. The chiller unit 100 may be a portion in which a refrigeration cycle is provided in the chiller system 10.

As illustrated in FIG. 2, the chiller unit 100 according to an embodiment includes a compressor 200, an evaporator 150, and a condenser 140.

The compressor 200 may be a component for compressing a refrigerant. The compressor 200 according to an embodiment may be provided as a turbo compressor that is a kind of centrifugal compressor. The centrifugal compressor is understood as a compressor in which the refrigerant is compressed and discharged by converting kinetic energy of the refrigerant into static pressure energy through a rotation body such as an impeller or a blade.

The condenser 140 may be a constituent in which the refrigerant discharged from the compressor 200 and the cooling water flowing through the cooling water circulation passage 40 are heat-exchanged with each other. That is, the refrigerant compressed by the compressor 200 may be introduced into the condenser 140. The evaporator 150 may be a constituent in which the refrigerant discharged from the condenser 140 and the cold water flowing through the cold water circulation passage 50 are heat-exchanged with each other.

Here, the condenser 140 is installed on a bottom surface, the evaporator 150 is installed above the condenser 140, and the compressor 200 is installed above the evaporator 150. The above-described arrangement is merely an example. For example, the compressor 200, the evaporator 150, and the condenser 140 may be disposed at various positions.

A condenser body 170 and an evaporator body 180, each of which has a cylindrical shape extending in an axial direction, are provided in the condenser 140 and the evaporator 150, respectively. The condenser body 170 and the evaporator body 180 may be provided to have the same length in the axial direction and be installed to be vertically spaced a predetermined distance from each other in parallel to each other. Particularly, the condenser body 170 and the evaporator body 180 may be installed so that the axial direction is parallel to the bottom surface.

Plates 172 and 182 for installation may be coupled to both ends of each of the condenser body 170 and the evaporator body 180, respectively. Each of the plates 172 and 182 may have a rectangular shape and be installed perpendicular to the bottom surface. Also, the plates 172 and 182 include a condensation plate 172 installed on the condenser body 170 and an evaporation plate 182 installed on the evaporator body 180.

A leg 171 provided in parallel to the bottom surface may be coupled to the condensation plate 172 so that the condensation plate 172 is stably installed on the bottom surface. A lower end of the evaporation plate 182 may be coupled to an upper end of the condensation plate 172. Here, each coupling may be performed through a coupling member such as a bolt or coupled through welding.

A cooling water accommodation part 174 and a cold water accommodation part 184, in which the cooling water and the cold water are accommodated, are provided in the condensation plate 172 and the evaporation plate 182, respectively.

In summary, in the condenser 140, the condensation plate 172 is coupled to each of both ends of the condenser body 170, and the cooling water accommodation part 174 is coupled to the outside of the condensation plate 172. Also, in the evaporator 150, the evaporation plate 182 is coupled to each of both ends of the evaporator body 180, and the cold water accommodation part 184 is coupled to the outside of the evaporation plate 182.

Cooling water coupling parts 176 and 177 and cold water coupling parts 186 and 187, which are coupled to cooling water circulation passage 40 and the cold water circulation passage 50, are provided in the cooling water accommodation part 174 and the cold water accommodation part 184, respectively.

In detail, a first cooling water coupling part 176 coupled to the cooling water inflow passage 42 and a second cooling water coupling part coupled to the cooling water outflow passage 44 may be provided in the cooling water accommodation part 174. Also, a first cold water coupling part 186 coupled to the cold water inflow passage 52 and a second cold water coupling part coupled to the cold water outflow passage 54 may be provided in the cold water accommodation part 184.

Referring to FIG. 2, the first cold water coupling part 186, the second cold water coupling part 187, the first cooling water coupling part 176, and the second cooling water coupling part 187 may be sequentially disposed in a vertical direction. However, the above-described arrangement is merely an example.

Also, a chiller unit 100 according to an embodiment may include a control box 160 in which a device capable of controlling each component is provided. The control box may be attached in the form of a box to one side of each of the condenser 140 and the evaporator 150.

The above-described constituents of the chiller unit may be merely an example and thus may be added, omitted, or modified. For example, an economizer may be further provided in the chiller unit 100.

Also, the compressor 200, the condenser 140, and the evaporator 150 are connected to each other through tubes.

Hereinafter, a tube connecting the condenser 140 to the evaporator 150 is called a connection tube 102. The connection tube 102 may be understood as a tube through which a liquid refrigerant condensed in the condenser 140 flows. Also, an expansion device 103 that expands the refrigerant may be provided in the connection tube 102.

Here, the chiller unit 100 may further include an injection tube 104 connecting the connection tube 102 to the compressor 200. The injection tube 104 may be understood as a tube through which at least a portion of the refrigerant flowing to the connection tube 102 flows.

That is, the injection tube 104 may be understood as a tube that is branched from the connection tube 102. Particularly, the injection tube 104 may be branched from a rear side rather than the expansion device 103 in the flow direction. Also, the injection tube 104 may be provided with an injection expansion device 105 expanding the refrigerant.

As described above, the arrangement of the connection tube 102 and the injection tube 104 may be provided differently according to the design. Also, the expansion device 103 and the injection expansion device 105 may be arranged in various shapes and number and at various positions.

For example, the injection expansion device 105 is omitted, and the injection tube 104 may be branched from the front side rather than the expansion device 103 in the flow direction. That is, the refrigerant expanded in the expansion device 103 may flow into the injection tube 104.

Also, the tube connecting the evaporator 150 to the compressor 200 is called a compressor inflow tube 106. The compressor inflow tube 106 may be understood as a tube through which the refrigerant evaporated in the evaporator 150 flows.

Also, a tube connecting the condenser 140 to the compressor 200 is called a compressor outflow tube 108. The compressor outflow tube 108 may be understood as a tube through which the refrigerant compressed in the compressor 200 flows.

Hereinafter, a flow of a fluid in the chiller system 10 will be described.

The refrigerant compressed by the compressor 200 flows to the condenser 140 along the compressor outflow tube 108. Also, the refrigerant is heat-exchanged with the cooling water in the condenser 140. In detail, the refrigerant flowing in the compressor 200 is introduced into the condenser body 170 and heat-exchanged with the cooling water while the refrigerant contacts the cooling water flowing through a plurality of cooling water tubes 175 provided in the condenser body 170.

Here, the refrigerant is condensed by releasing heat to the cooling water, and thus, the cooling water increases in temperature by receiving the heat of the refrigerant. When the cooling tower 20 is omitted in the chiller system 10, the refrigerant may be heat-exchanged with external air.

The refrigerant condensed in the condenser 140 flows to the evaporator 150 along the connection tube 103. Here, a portion of the refrigerant flowing into the connection tube 103 may flow to the compressor 200 along the injection tube 104.

Also, the refrigerant flowing into the connection tube 103 may be expanded in the expansion device 103 and introduced into the evaporator 150. Also, the refrigerant is heat-exchanged with the cold water in the evaporator 150.

In detail, the refrigerant is introduced into the evaporator body 180 and heat-exchanged with the cold water while the refrigerant contacts the cold water flowing through a plurality of cold water tubes 185 provided in the evaporator body 180. Here, the refrigerant absorbs heat of the cold water and then is evaporated, and the cold water loses the heat to the refrigerant to decreases in temperature.

Also, the refrigerant evaporated by being heat-exchanged with the cold water flows to the compressor 200 along the compressor inflow tube 106. Also, the refrigerant may circulate through the above process.

Hereinafter, the compressor 200 will be described in detail based on the above-described structure.

Figure 3:
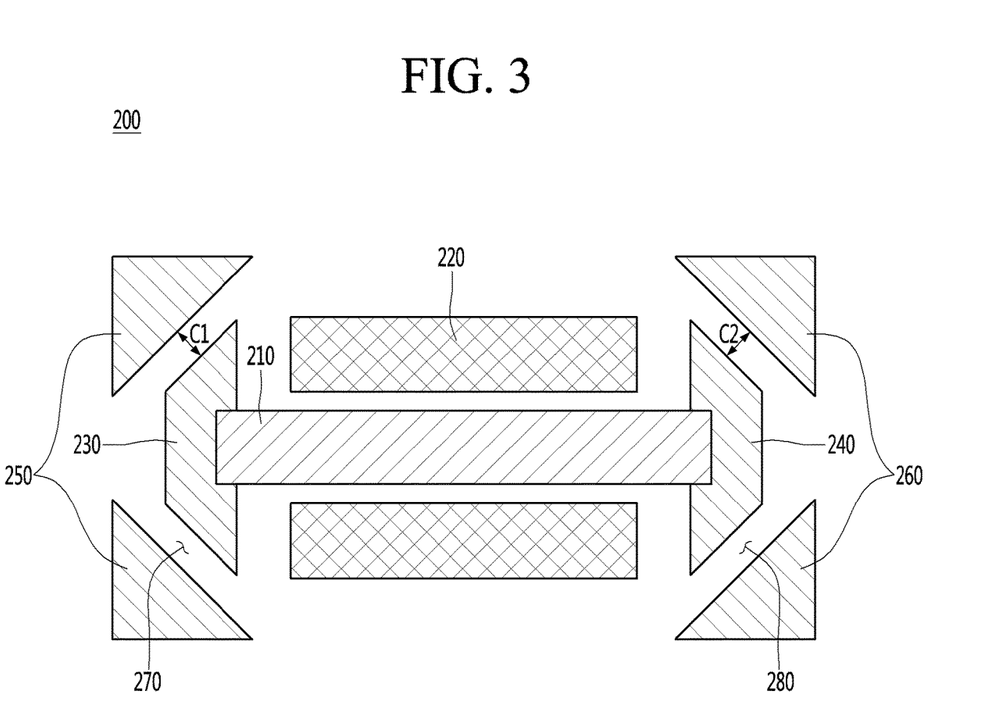
FIG. 3 is a view illustrating a configuration of the turbo compressor according to an embodiment.

FIG. 3 is a view illustrating a configuration of the turbo compressor according to an embodiment. In FIG. 3, for convenience of illustration, a cross section of the compressor 200 is schematically illustrated. Thus, the constituents of the compressor 200 is not limited thereto and may be added or omitted.

As illustrated in FIG. 3, the compressor 200 includes a stator 220, a driving shaft 210, impellers 230 and 240, and shrouds 250 and 260. Here, the stator 220 and the driving shaft 210 may be classified as a motor part, the impellers 230 and 240 and the shrouds 250 and 260 may be classified as a compression part.

Referring to the motor part, the stator 220 corresponds to a fixed constituent, and the driving shaft 210 corresponds to a rotatable constituent. The stator 220 and the driving shaft 210 are spaced apart from each other. Here, the compressor 200 may be provided with a housing (not shown) to which the stator 220 is fixed and which defines an outer appearance of the compressor 200.

The driving shaft 210 may be provided with a rotor for generating an electromagnetic force together with the stator 220. In detail, the rotor may be disposed within the driving shaft 210. However, this is merely an example, and the compressor 200 may include a shaft and a rotor, which are separated from each other, and the rotor may be disposed outside the shaft.

Here, the driving shaft 210 is disposed to extend in an axial direction. That is, the axial direction means a direction in which the driving shaft 210 extends. In FIG. 3, the axial direction corresponds to a horizontal direction. Also, a direction perpendicular to the axial direction is called a radial direction, and a longitudinal direction in FIG. 3 corresponds to one of the radial directions.

The stator 220 is disposed to surround the outside of the driving shaft 210. That is, the stator 220 is disposed outside the driving shaft 210 in the radial direction. For example, the stator 220 may be provided in a cylindrical shape having the inside that is penetrated in the axial direction.

Referring to the compression part, the impellers 230 and 240 rotate together with the driving shaft 210. Also, the shrouds 250 and 260 are generally understood as fixed constituents. However, in the compressor 200 according to an embodiment, a portion of the shrouds 250 and 260 are provided to be movable.

The impellers 230 and 240 are understood as constituents in which the refrigerant is suctioned in the axial direction and discharged in the radial direction. In detail, the impellers 230 and 240 rotate together with the driving shaft 210, and the refrigerant is suctioned into the impellers 230 and 240 by rotational force. The refrigerant passes through the impellers 230 and 240 to increase in flow rate and pressure.

Also, the refrigerant is discharged in the radial direction and increases in pressure by a decrease in flow rate due to the expanded cross-sectional area. Thus, the refrigerant discharged from the impellers 230 and 240 may have a high pressure.

Also, the compressor 200 according to an embodiment includes the pair of impellers 230 and 240 respectively disposed at both ends of the driving shaft 210. As described above, the impeller is divided into a first impeller 230 and a second impeller 240.

Here, the first impeller 230 corresponds to a first-stage impeller compressing the refrigerant in one stage, and the second impeller 240 corresponds to a second-stage impeller compressing the refrigerant in two stages. Thus, the compressor 200 according to an embodiment may be understood as a two-stage compression turbo compressor.

The shrouds 250 and 260 are understood as constituents that accommodate the impellers 230 and 240 to provide a compression space. In FIG. 3, only the shrouds 250 and 260 are schematically illustrated, but the shrouds 250 and 260 may be provided in various shapes, i.e., may provide a diffuser and a volute. Also, the shrouds 250 and 260 may be coupled to the housing (not shown) to which the stator 220 is fixed to define an outer appearance thereof.

The shrouds 250 and 260 are also provided in a pair corresponding to the impellers 230 and 240. In detail, the shrouds 250 and 260 may be divided into a first shroud 250 that accommodates the first impeller 230 and a second shroud 260 that accommodates the second shroud 260.

The first impeller 230 and the first shroud 250 may be referred to as a first-stage side, and the second impeller 240 and the second shroud 260 may be referred to as a second-stage side. In FIG. 3, a left side corresponds to the first-stage, and a right side corresponds to the second-stage side.

Referring to the flow of the refrigerant, the refrigerant passing through the evaporator 150 is introduced to the first-stage side. In detail, the refrigerant is introduced into the first shroud 250 toward the first impeller 230 in the axial direction. Also, the refrigerant is compressed in one stage and discharged in the radial direction of the first impeller 230.

Also, the refrigerant discharged from the first impeller 230 flows into the second-stage side. In detail, the refrigerant is introduced into the second shroud 260 toward the second impeller 240 in the axial direction. Also, the refrigerant is compressed in two stages and discharged in the radial direction of the second impeller 240 to flow to the condenser 140.

Here, a predetermined gap is generated between the shrouds 250 and 260 and the impellers 230 and 240. As described above, the impellers 230 and 240 are the rotatable constituents, and the shrouds 250 and 260 are the fixed constituents. Thus, the shrouds 250 and 260 and the impellers 230 and 240 are spaced apart from each other so as not to interfere with the rotation of the impellers 230 and 240.

Also, the compressor 200 may support the driving shaft 210 with a gas bearing. In detail, the driving shaft 210 is not disposed in a completely fixed state in the radial direction, but is disposed at a predetermined interval. That is, the driving shaft 210 may move by the predetermined interval in the radial direction.

Also, the driving shaft 210 is not disposed in a completely fixed state in the axial direction. That is, the driving shaft 210 may move in the axial direction. The axial movement of the driving shaft 210 will be described later in detail.

Also, as the driving shaft 210 rotates, the driving shaft 210 is floated by a pressure of the refrigerant. That is, the gas bearing means supporting the driving shaft 210 by the pressure of the refrigerant.

Here, an axial center when the driving shaft 210 normally rotates is referred to as a central axis. Before the driving shaft 210 rotates, the driving shaft 210 is disposed below the central axis by gravity. Also, as the driving shaft 210 rotates, it may be supported by a working fluid and disposed in line with the central axis.

Since the impellers 230 and 240 are coupled to the driving shaft 210, the impellers 230 and 240 may move together with the driving shaft 210. That is, since the impellers 230 and 240 move in a relatively large range according to the driving, the shrouds 250 and 260 and the impellers 230 and 240 are relatively spaced apart from each other.

Hereinafter, a space by which the first impeller 230 and the first shroud 250 are spaced apart from each other is called a first gap 270. Also, a space by which the second impeller 240 and the second shroud 260 are spaced apart from each other is called a second gap 280. The first gap 270 and the second gap 280 are defined to surround radially the outside of the impellers 230 and 240.

According to the design and operation, a length of each of the first gap 270 and the second gap 280 may vary. Here, the lengths of the first gap 270 and the second gap 280 are referred to as a first gap length C1 and a second gap length C2, respectively. The first gap length C1 is a spaced distance between the first impeller 230 and the first shroud 250, and the second gap length C2 is a spaced distance between the second impeller 240 and the second shroud 260.

Particularly, the first gap length C1 and the second gap length C2 correspond to minimally spaced distances between the first and second impellers 230 and 240 and the first and second shrouds 250 and 260. However, this corresponds to an exemplary criterion for comparing the first gap length C1 and the second gap length C2. Thus, the first gap length C1 and the second gap length C2 may be measured differently by different criteria.

As described above, the first and second impellers 230 and 240 and the first and second shrouds 250 and 260 are relatively largely spaced apart from each other. Thus, the first gap length C1 and the second gap length C2 correspond to relatively large values. Thus, an interference between the first and second impellers 230 and 240 and the first and second shrouds 250 and 260 may be prevented.

When the compressor 200 is driven, the first and second impellers 230 and 240 rotate, and the refrigerant is compressed. Here, leakage of the refrigerant may occur through the first gap 270 and the second gap 280. In detail, the refrigerant compressed and discharged by the first and second impellers 230 and 240 may flow to a suction side along the first gap 270 and the second gap 280.

Thus, an amount of refrigerant compressed and discharged is reduced, and flow resistance of the suctioned refrigerant may occur. That is, efficiency of the compressor 200 is deteriorated. Thus, it is necessary to minimize the first gap length C1 and the second gap length C2.

In summary, in a driving stop process and a driving preparation process of the compressor 200, the first gap length C1 and the second gap length C2 have be relatively large. Also, in a driving process of the compressor 200, the first gap length C1 and the second gap length C2 have to be relatively small.

Hereinafter, a variation in the first gap length C1 and the second gap length C2 according to the process of driving the compressor 200 will be described.

Figure 4:
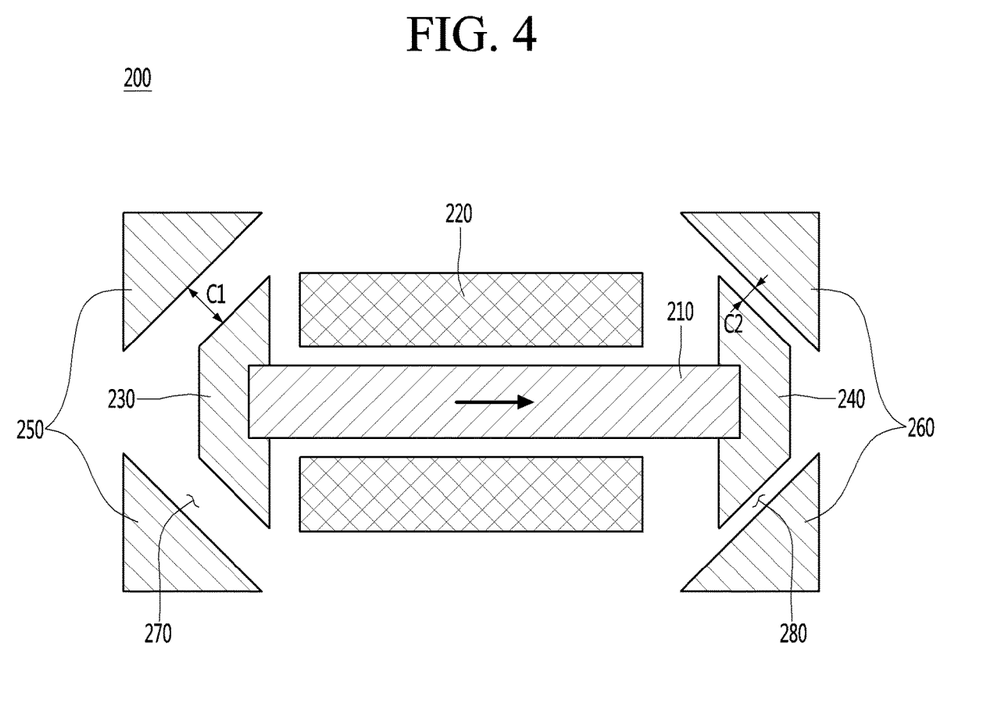
FIGS. 4 to 6 are views illustrating a process of driving the turbo compressor according to an embodiment.
Figure 5:
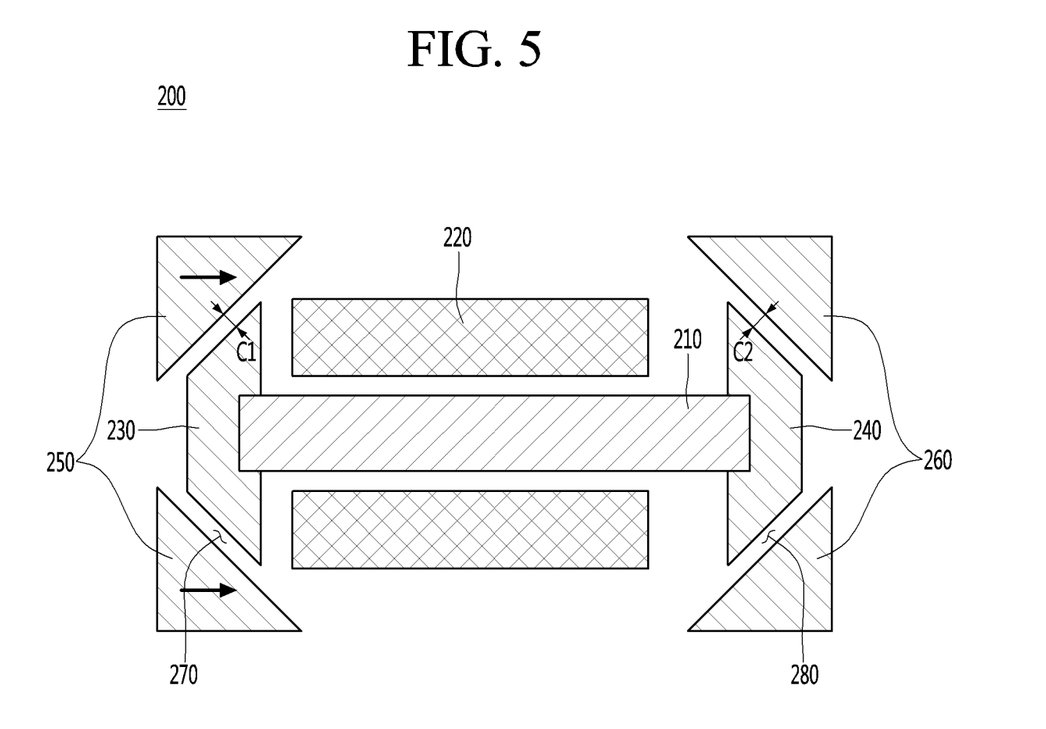
Figure 6:
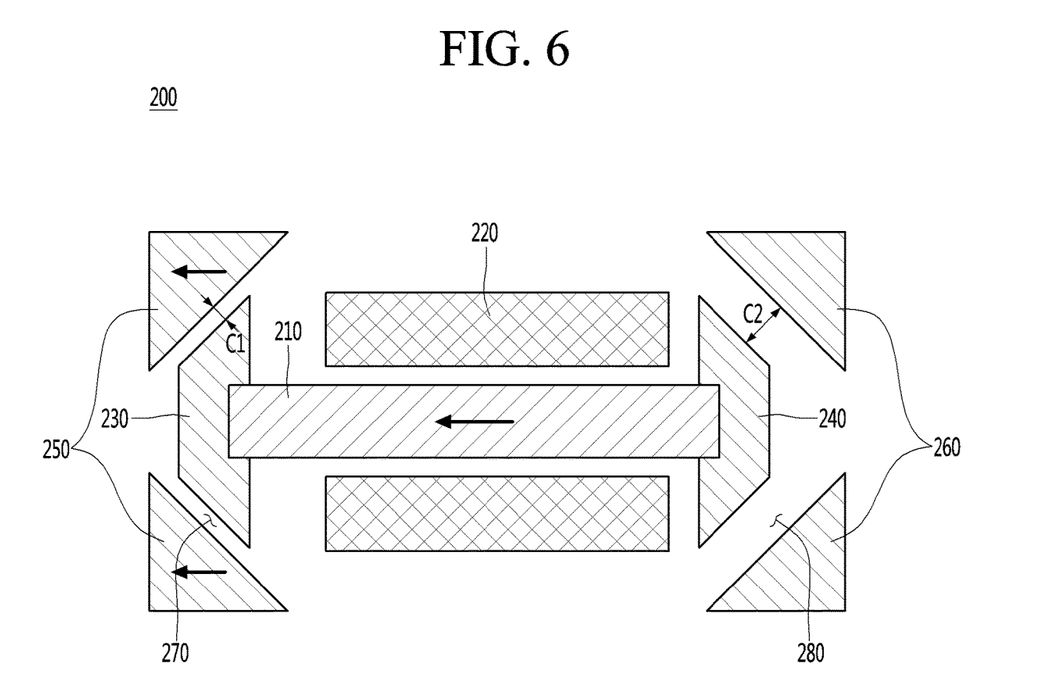

FIGS. 4 to 6 are views illustrating a process of driving the turbo compressor according to an embodiment. FIGS. 4 to 6 illustrate a variation in the first gap length C1 and the second gap length C2, based on FIG. 3. For convenience of description, the first gap length C1 and the second gap length C2 and their variations are exaggerated.

FIGS. 3 to 6 illustrate the driving process of the compressor 200 in sequence. FIG. 3 is classified as a stop process, FIG. 4 is classified as a drive preparation process, FIG. 5 is classified as a driving process, and FIG. 6 is classified as a driving end process.

The stop process of the compressor 200 illustrated in FIG. 3 may be understood as a state in which the flow of the refrigerant is stopped. In detail, it may be understood that the flow of the refrigerant is stabilized so as not to affect each constituent.

As illustrated in FIG. 3, in the stop process of the compressor 200, the first gap length C1 and the second gap length C2 are provided substantially the same (C1=C2). Also, according to the design, the first gap length C1 and the second gap length C2 may correspond to somewhat different values.

Here, the positions of the driving shaft 210 and the first and second impellers 230 and 240 are referred to as reference positions. Particularly, each of the reference positions means a reference position in the axial direction. As described above, the radial movement of the driving shaft 210 and the first and second impellers 230 and 240 are not illustrated in FIGS. 3 to 6.

In summary, when the driving shaft 210 and the first and second impellers 230 and 240 are disposed at the reference positions, the first gap length C1 and the second gap length C2 have the same value. Also, the first gap length C1 and the second gap length C2 correspond to relatively large values.

The driving preparation process of the compressor 200 illustrated in FIG. 4 may be understood as a state in which the flow of the refrigerant is generated by the rotation of the driving shaft 210 and the first and second impellers 230 and 240. In detail, it may be understood that the compressor 200 reaches target compression of the refrigerant. That is, this is a case when the flow of the refrigerant does not yet occur normally.

As illustrated in FIG. 4, in the driving preparation process of the compressor 200, the first gap length C1 and the second gap length C2 vary differently. In detail, the first gap length C1 becomes large, and the second gap length C2 becomes small. That is, the first gap length C1 is larger than the second gap length C2 (C1>C2).

This is because the driving shaft 210 and the first and second impellers 230 and 240 are moved to the second stage side from the reference position. That is to say, the driving shaft 210 and the first and second impellers 230 and 240 move toward the second shroud 260. Thus, the second impeller 240 and the second shroud 260 are close to each other, and the first impeller 230 and the first shroud 250 are far from each other.

The movement of the driving shaft 210 and the first and second impellers 230 and 240 occur by the pressure difference between the first-stage side and the second-stage side. As described above, the pressure at the second-stage side is higher than that at the first-stage side. Due to the pressure difference, a difference in thrust force on rear surfaces of the first impeller 230 and the second impeller 249 occurs.

In detail, the thrust force (the left direction in FIG. 3), which pushes the first impeller 230 outwardly, is generated by the refrigerant compressed and discharged from the first impeller 230. Also, the thrust force (the right direction in FIG. 3), which pushes the second impeller 240 outward in the axial direction, is generated by the refrigerant compressed and discharged from the second impeller 240.

Here, the thrust force on the second impeller 240 is greater than thrust force on the first impeller 230. Thus, the driving shaft 210 and the first and second impellers 230 and 240 generally move outwardly in the axial direction of the second impeller 240, that is, in the right direction in FIG. 3.

This difference in thrust force may be greater as the driving shaft 210 and the first and second impellers 230 and 240 rotate at a high speed. Thus, the compressor 200 starts to be driven, and the driving shaft 210 and the first and second impellers 230 and 240 gradually move to the right side.

In summary, as the refrigerant flows, the driving shaft 210 and the first and second impellers 230 and 240 move to the second-stage side from the reference positions. Thus, the first gap length C1 increases, and the second gap length C2 decreases. Here, the second gap length C2 may be small enough to prevent the leakage of the refrigerant, and thus the efficiency of the second stage may increase.

However, since the first gap length C1 is larger, a large amount of refrigerant may leak. That is, the efficiency of the first stage side may be very deteriorated. To prevent this, the first shroud 250 moves in the axial direction in the compressor 200 according to an embodiment.

The driving process of the compressor 200 illustrated in FIG. 5 may be understood as a state in which the compressor 200 is normally driven. In detail, it may be understood that the compressor 200 operates by reaching the target compression of the refrigerant.

As illustrated in FIG. 5, in the driving process of the compressor 200, the first gap length C1 and the second gap length C2 are provided substantially the same (C1=C2). However, according to the design, the first gap length C1 and the second gap length C2 may correspond to somewhat different values.

This is because the first shroud 250 moves toward the first impeller 230 so that the first gap length C1 becomes smaller. That is, the first shroud 250 moves to the second stage to correspond to the driving shaft 210 and the first and second impellers 230 and 240, which move from the reference position to the second-stage side.

Here, for convenience of description, the movement of the driving shaft 210 and the first and second impellers 230 and 240, and the movement of the first shroud 250 are separately illustrated in FIGS. 4 and 5. However, in practice, the movement of the driving shaft 210 and the first and second impellers 230 and 240 and the movement of the first shroud 250 may be performed at almost the same time.

That is, when the compressor 200 is driven, the driving shaft 210, the first and second impellers 230 and 240, and the first shroud 250 move together in the axial direction. Thus, the first gap length C1 and the second gap length C2 may be reduced to prevent the refrigerant from leaking.

The driving end process of the compressor 200 illustrated in FIG. 6 may be understood as a process in which the driving of the compressor 200 is stopped. In detail, the driving end process corresponds to an intermediate process converted from the driving process of FIG. 5 to the stop process of FIG. 3.

As the rotation of the driving shaft 210 and the first and second impellers 230 and 240 is stopped, the thrust force on the first and second impellers 230 and 240 is removed. Thus, the driving shaft 210 and the first and second impellers 230 and 240 move to the reference positions. That is, the driving shaft 210 and the first and second impellers 230 and 240 move to the first-stage side. Thus, the second gap length C2 gradually increases.

Also, in response to the movement of the driving shaft 210 and the first and second impellers 230 and 240, the first shroud 250 moves. The first gap length C1 varies according to the moving speeds of the driving shaft 210, the first and second impellers 230 and 240, and the first shroud 250.

For example, when the driving shaft 210, the first and second impellers 230 and 240, and the first shroud 250 move at the same speed, the first gap length C1 is equally maintained. Also, according to the relative movement speed, the first gap length C1 may be narrowed or widened.

As a result, each of the first gap length C1 and the second gap length C2 may be provided to have a length corresponding to FIG. 3. Thus, the interference between the first and second impellers 230 and 240, the first shroud 250, and the second shroud 260 may be prevented.

As described above, the first shroud 250 moves due to the axial movement of the driving shaft 210 and the first and second impellers 230 and 240. Thus, the interference between the impellers 230 and 240 and the shrouds 250 and 260 may be prevented, and also, the leakage of the refrigerant may be prevented.

Hereinafter, a gap adjustment structure for moving the first shroud 250 will be described according to various embodiments. In FIGS. 7 to 10, the passage of the refrigerant is expressed as an arrow. For example, the arrows illustrated in FIGS. 7 to 10 may be understood as refrigerant tubes through which the refrigerant flows.

Figure 7:
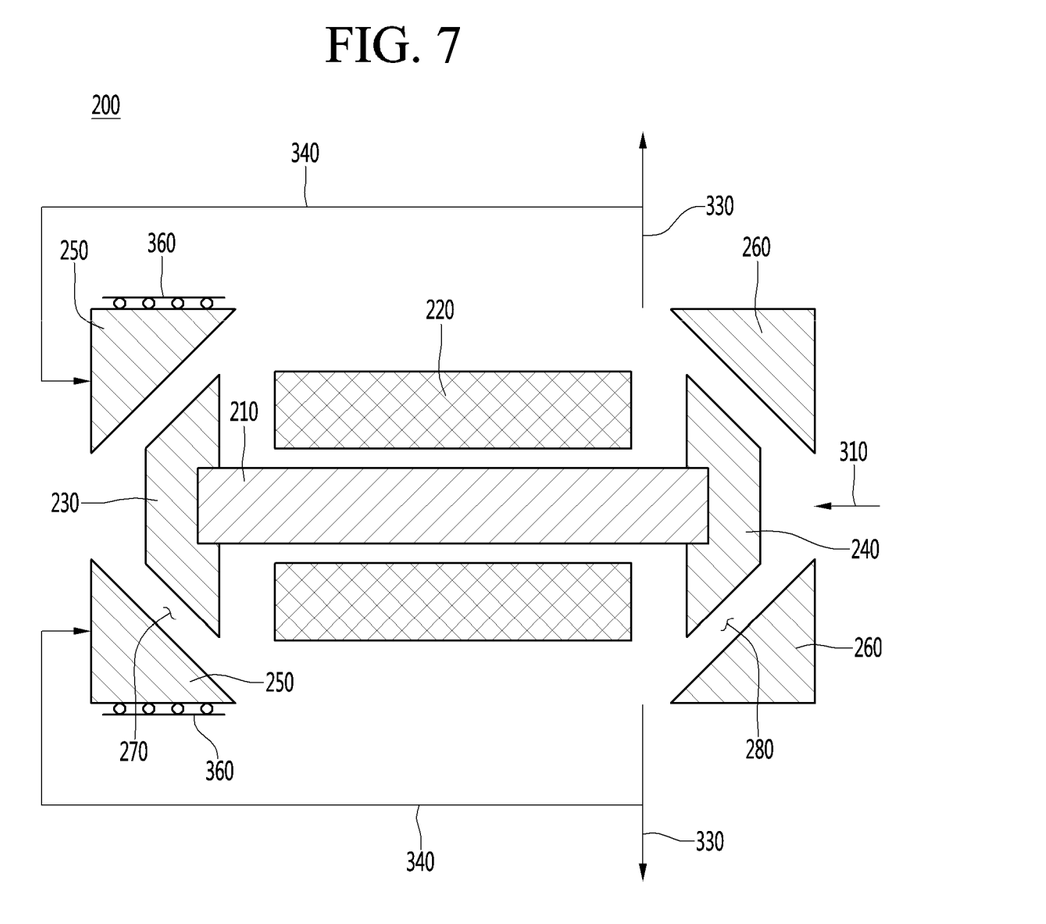
FIG. 7 is a view illustrating a gap adjustment structure of a turbo compressor according to a first embodiment.

FIG. 7 is a view illustrating a gap adjustment structure of a turbo compressor according to a first embodiment.

As illustrated in FIG. 7, a first shroud 250 moves by a refrigerant discharged from a second-stage side. Here, for convenience of description, since only a flow of the refrigerant associated with movement of the first shroud 250 is illustrated, a flow of the refrigerant at a first-stage side is omitted.

Referring to the flow of the refrigerant at the second-stage side, a second-stage inflow passage 310 through which the refrigerant is suctioned into a second impeller 240 is provided. The refrigerant discharged from the first-stage side flows through the second-stage inflow passage 310. The second-stage inflow passage 310 is provided in a second impeller 240 in an axial direction.

Also, a second-stage outflow passage 330 through which the refrigerant is discharged from the second impeller 240 is provided. A two-stage compressed refrigerant flows through the second-stage outflow passage 330. Also, the two-stage outflow passage 330 is connected to a condenser 140 to supply the two-stage compressed refrigerant to the condenser 140.

Here, a gap adjustment passage 340 branched from the second-stage outflow passage 330 to extend to the first-stage side is provided. In detail, the gap adjustment passage 340 extends toward the first shroud 250. Also, the first shroud 250 may move toward the second-stage side in the axial direction by the refrigerant flowing into the gap adjustment passage 340.

The driving process of the compressor 200 of FIGS. 3 to 6 will be described through the above-described structure. As the compressor 200 is driven, a driving shaft 210 and first and second impellers 230 and 240 move to the second-stage side as illustrated in FIGS. 3 to 4.

Also, in FIG. 4, the refrigerant compressed in two stages is supplied to the gap adjustment passage 340 to allow the first shroud 250 to move to the second-stage side as illustrated in FIG. 5. As a result, as the compressor 200 is driven, the driving shaft 210, the first and second impellers 230 and 240, and the first shroud 250 move as illustrated in FIGS. 3 to 5.

Also, since the refrigerant having a high pressure is supplied to the first shroud 250 in two stages, a first gap 270 may be narrower. As a result, as the compressor 200 is driven, the first gap 270 and the second gap 280 may be narrower.

Here, the compressor 200 is further provided with a guide device 360 to guide axial movement of the first shroud 250. That is, the guide device 360 is understood as a constituent configured to prevent the first shroud 250 from moving in the radial direction, not the axial direction.

Also, as the driving shaft 210 and the first and second impellers 230 and 240 rotate at a higher speed, the driving shaft 210 and the first and second impellers 230 and 240 further move. Also, the first shroud 250 also correspondingly moves further.

Also, as the driving of the compressor 200 is stopped, the driving shaft 210, the first and second impellers 230 and 240, and the first shroud 250 move as illustrated in FIGS. 5 to 6. Also, the driving shaft 210, the first and second impellers 230 and 240 and the first shroud 250 return to reference positions.

That is, the driving shaft 210, the first and second impellers 230 and 240, and the first shroud 250 move according to the pressure of the refrigerant passing through the compressor 200. Thus, the driving shaft 210, the first and second impellers 230 and 240, and the first shroud 250 may correspond to each other to move together.

Figure 8:
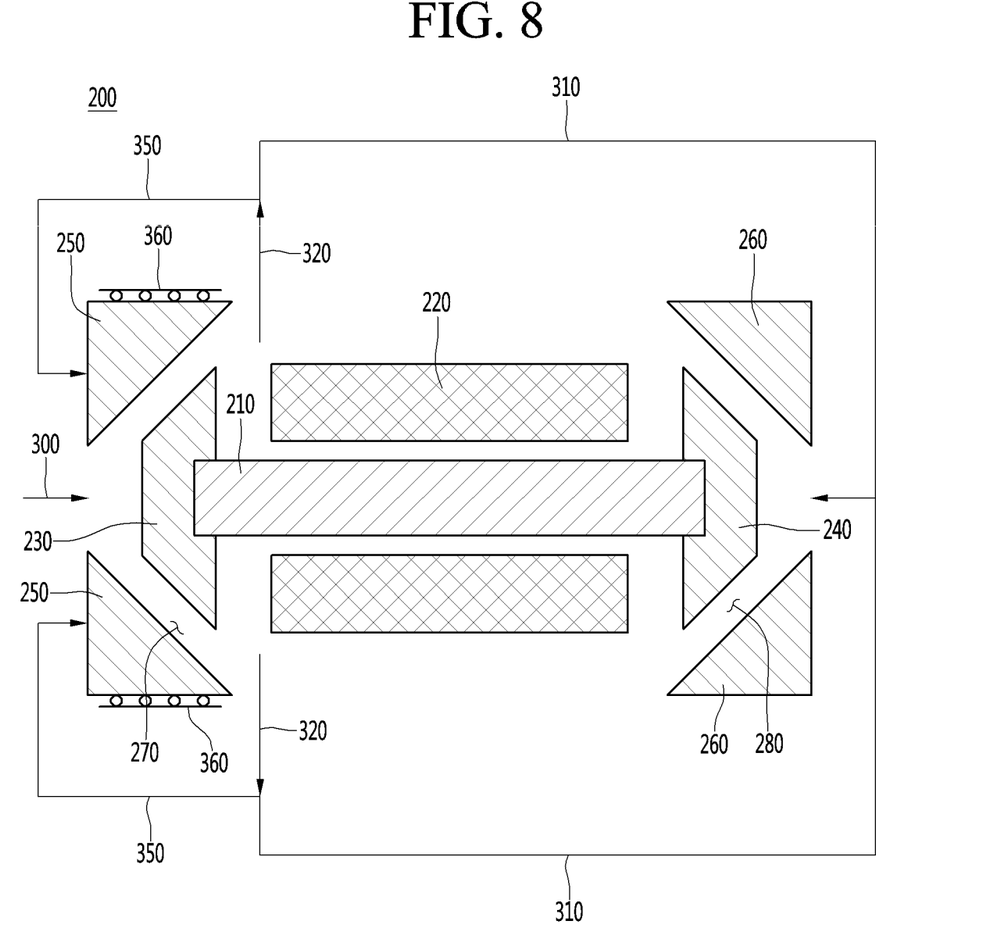
FIG. 8 is a view illustrating a gap adjustment structure of a turbo compressor according to a second embodiment.

FIG. 8 is a view illustrating a gap adjustment structure of a turbo compressor according to a second embodiment.

As illustrated in FIG. 8, a first shroud 250 moves by a refrigerant discharged from a first-stage side. Here, for convenience of description, since only a flow of the refrigerant associated with movement of the first shroud 250 is illustrated, a flow of the refrigerant at a second-stage side is partially omitted.

Referring to the flow of the refrigerant at the first-stage side, a first-stage inflow passage 300 through which the refrigerant is suctioned into a first impeller 230 is provided. The refrigerant discharged from an evaporator 150 flows to the first-stage inflow passage 300. The first-stage inflow passage 300 is provided in a first impeller 230 in an axial direction.

Also, a first-stage outflow passage 320 through which the refrigerant is discharged from the first impeller 230 is provided. The first-stage compressed refrigerant flows through the first-stage outflow passage 320. Also, the first stage outflow passage 320 is connected to the second-stage inflow passage 310 to supply the refrigerant compressed in one stage to the second-stage side.

Here, a gap adjustment passage 350 branched from the first-stage outflow passage 320 to extend toward the first shroud 250 is provided. The gap adjustment passage 340 of FIG. 7 and the gap adjustment passage 350 of FIG. 8 have the same function except that the refrigerant flowing to each other is different.

That is, the gap adjustment passage 350 moves the first shroud 250 to correspond to the driving shaft 210 and the first and second impellers 230 and 240. The movement of the first shroud 250 and the guide device 360 by the gap adjustment passage 350 refer to the above description.

Hereinafter, differences between the gap adjustment passage 340 of FIG. 7 and the gap adjustment passage 350 of FIG. 8 will be described.

Since the gap adjusting passage 340 of FIG. 7 supplies the refrigerant compressed in two stages, the first shroud 250 receives a greater pressure. That is, since the first shroud 250 further moves to the second-stage side, the first gap 270 is relatively narrowed. Thus, the leakage of the refrigerant generated between the first impeller 230 and the first shroud 250 may be more effectively prevented.

The gap adjustment passage 350 of FIG. 8 is branched from the first-stage outflow passage 320 to extend to the first shroud 250, thereby providing a simpler structure. That is, the gap adjustment passage 350 may be shorter in length. Thus, since an amount of refrigerant supplied to the gap adjustment passage 350 is small, the efficiency of the compressor 200 may increase.

Also, the compressor 200 may include the gap adjustment passage branched from the first-stage outflow passage 320 and the second-stage outflow passage 330. That is, the refrigerant that is compressed in one stage and the refrigerant that is compressed in two stages are supplied to the first shroud 250 to move in the axial direction. Due to the above-described structure, an amount of refrigerant used for the movement of the first shroud 250 may be reduced, and the first gap length C1 may be effectively reduced.

In summary, the gap adjustment passages 340 and 350 may extend from the at least one of the first-stage outflow passage 320 or the second-stage outflow passage 330 to the first shroud 250.

Figure 9:
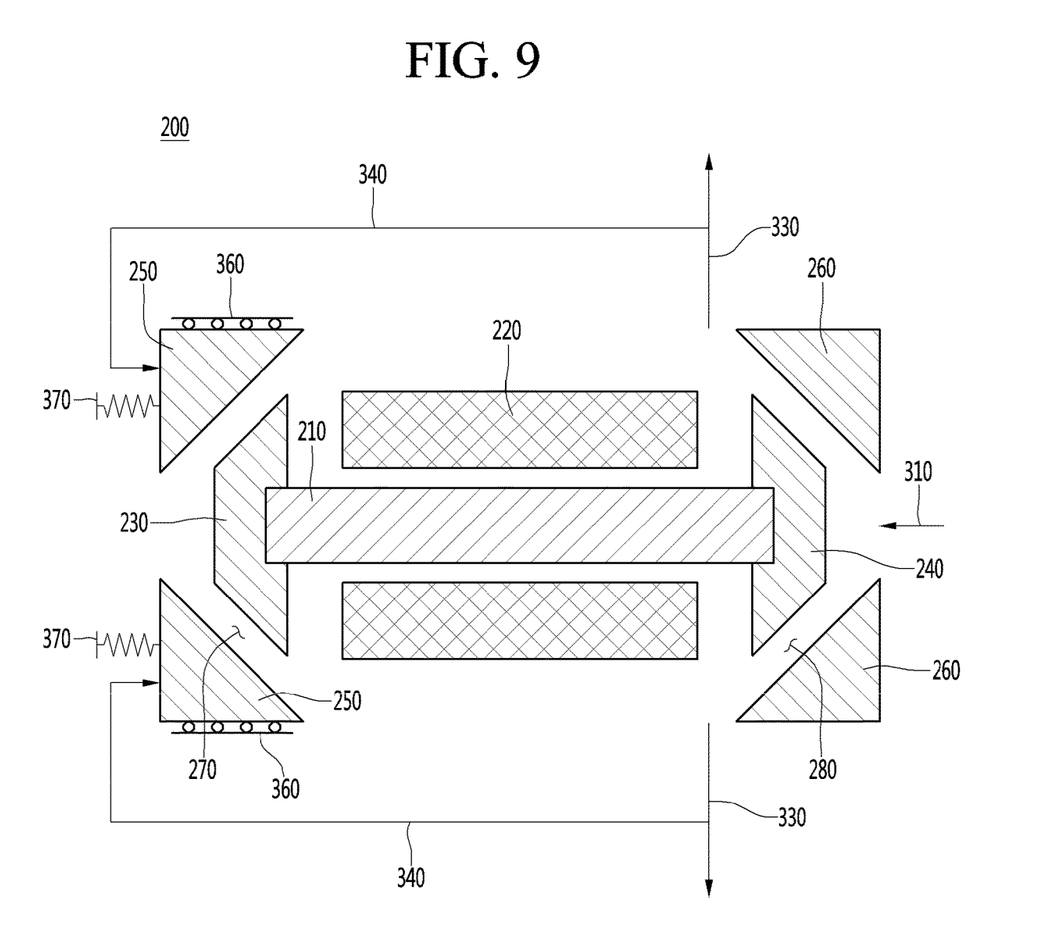
FIG. 9 is a view illustrating a gap adjustment structure of a turbo compressor according to a third embodiment.

FIG. 9 is a view illustrating a gap adjustment structure of a turbo compressor according to a third embodiment.

Referring to FIG. 9, a gap adjustment passage 340 illustrated in FIG. 7 is provided. However, this is merely an example, and the gap adjustment passage 350 illustrated in FIG. 8 may be provided, or the gap adjustment passage branched from the first-stage outflow passage 320 and the second-stage outflow passage 330 may be provided.

The compressor 200 includes a gap adjustment member 370 coupled to a first shroud 250. The gap adjustment member 370 corresponds to a constituent for moving the first shroud 250 in an axial direction. Particularly, the gap adjustment member 370 corresponds to an elastic member having an elastic force in the axial direction.

For example, the gap adjustment member 370 corresponds to a spring that is tensioned and compressed in the axial direction. Particularly, the gap adjustment member 370 is disposed outside the first shroud 250 in the axial direction together with one end of the gap adjustment passage 350.

The driving process of the compressor 200 of FIGS. 3 to 6 will be described through the above-described structure. As the compressor 200 is driven, a driving shaft 210 and first and second impellers 230 and 240 move to the second-stage side as illustrated in FIGS. 3 to 4.

Also, in FIG. 4, the refrigerant compressed in two stages is supplied to the gap adjustment passage 340 to allow the first shroud 250 to move to the second-stage side as illustrated in FIG. 5. Here, the gap adjustment member 370 is tensioned in the axial direction. That is, the refrigerant flowing into the gap adjustment passage 340 acts as an external force, and thus, the gap adjustment member 370 may be tensioned.

As a result, as the compressor 200 is driven, the driving shaft 210, the first and second impellers 230 and 240, and the first shroud 250 move as illustrated in FIGS. 3 to 5.

Also, as the driving of the compressor 200 is stopped, the driving shaft 210, the first and second impellers 230 and 240, and the first shroud 250 move as illustrated in FIGS. 5 to 6. Also, the driving shaft 210, the first and second impellers 230 and 240 and the first shroud 250 return to reference positions.

Here, the elastic force is applied to the first shroud 250 by the gap adjustment member 370. That is, as the external force generated by the gap adjustment passage 340 disappears, the gap adjustment member 340 is compressed in the axial direction to return.

Thus, the first shroud 250 may move faster than the driving shaft 210 and the first and second impellers 230 and 240. As a result, the first gap length C1 may be more largely secured, and an interference between the first impeller 230 and the first shroud 250 may be prevented.

Figure 10:
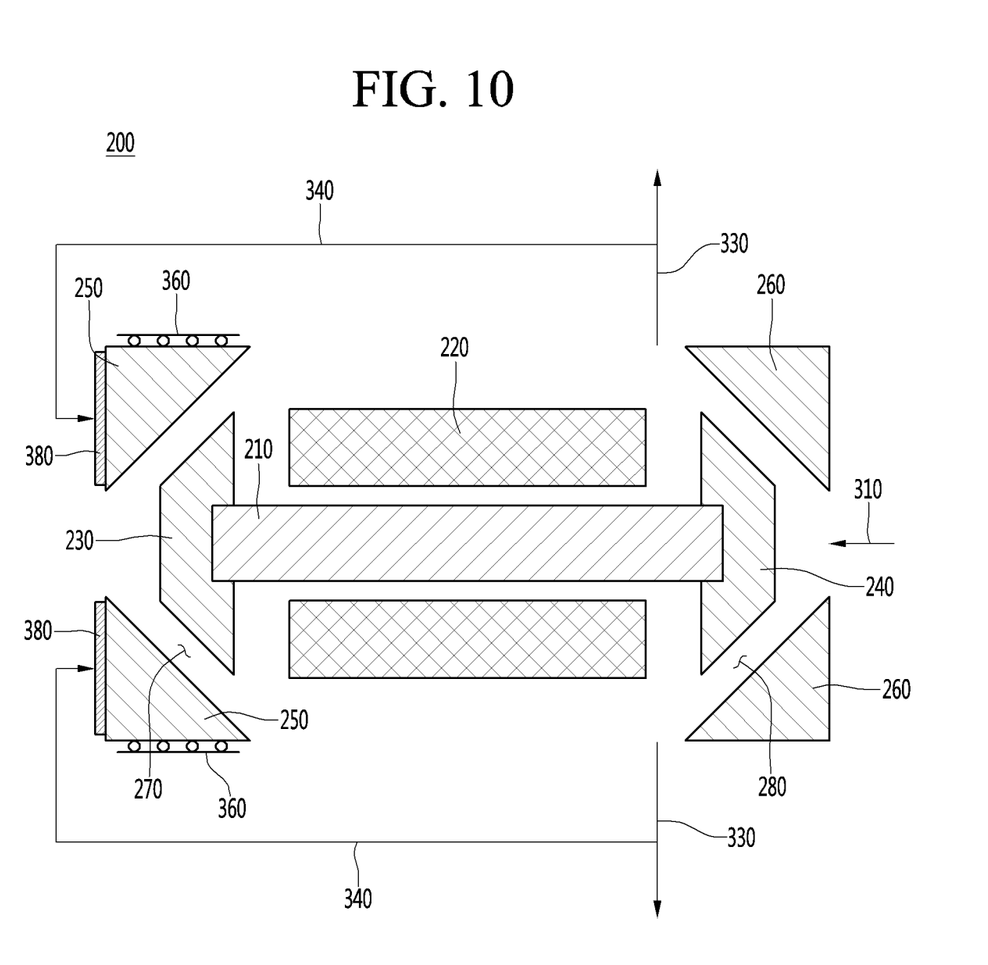
FIG. 10 is a view illustrating a gap adjustment structure of a turbo compressor according to a fourth embodiment.

FIG. 10 is a view illustrating a gap adjustment structure of a turbo compressor according to a fourth embodiment.

Referring to FIG. 10, a gap adjustment passage 340 illustrated in FIG. 7 is provided. However, this is merely an example, and the gap adjustment passage 350 illustrated in FIG. 8 may be provided, or the gap adjustment passage branched from the first-stage outflow passage 320 and the second-stage outflow passage 330 may be provided.

The compressor 200 includes a gap adjustment member 380 coupled to a first shroud 250. The gap adjustment member 380 corresponds to a constituent for moving the first shroud 250 in an axial direction. Here, the gap adjustment member 380 may correspond to a thermal expansion member having a large thermal expansion coefficient.

For example, the gap adjustment member 380 may correspond to a polymer attached to one side of the first shroud 250. Particularly, the gap adjustment member 380 may be disposed to cover an outer surface of the first shroud 250 in the axial direction. Thus, the refrigerant flowing through the gap adjustment passage 350 may be directly supplied to the gap adjustment member 380.

The driving process of the compressor 200 of FIGS. 3 to 6 will be described through the above-described structure. As the compressor 200 is driven, a driving shaft 210 and first and second impellers 230 and 240 move to the second-stage side as illustrated in FIGS. 3 to 4.

Also, in FIG. 4, the refrigerant compressed in two stages is supplied to the gap adjustment passage 340 to allow the first shroud 250 to move to the second-stage side as illustrated in FIG. 5. Here, the two-stage compressed refrigerant has a high temperature as well as a high pressure. As a result, the gap adjustment member 380 may be expanded to move the first shroud 250 further.

As a result, as the compressor 200 is driven, the driving shaft 210, the first and second impellers 230 and 240, and the first shroud 250 move as illustrated in FIGS. 3 to 5. Here, the first shroud 250 further moves by the gap adjustment member 380 so that the first gap 270 is narrower.

Also, as the driving of the compressor 200 is stopped, the driving shaft 210, the first and second impellers 230 and 240, and the first shroud 250 move as illustrated in FIGS. 5 to 6. Here, the gap adjustment member 380 may be contracted, and the first shroud 250 may move.

Hereinafter, differences between the gap adjustment passage 370 of FIG. 9 and the gap adjustment passage 380 of FIG. 10 will be described.

The gap adjustment member 370 of FIG. 9 has a function of returning the first shroud 250 more quickly when the driving of the compressor 200 is stopped. Also, the gap adjustment member 370 applies an external force to the first shroud 250 in a direction away from the first impeller 230. Thus, the first impeller 230 and the first shroud 250 may be prevented from interfering with each other even in an emergency situation due to instability of the refrigerant.

The gap adjustment member 380 of FIG. 10 functions of moving the first shroud 250 so that the first gap 270 is narrowed. Thus, the leakage of the refrigerant between the first impeller 230 and the first shroud 250 may be effectively prevented. Also, the gap adjustment member 380 may be provided to cover one surface of the first shroud 250 to prevent the refrigerant supplied to the gap adjustment passage to directly affecting the first shroud 250.

In summary, the compressor 200 includes a gap adjustment passage or a gap adjustment passage and a gap adjustment member, by which the first shroud 250 moves. The gap adjustment passage corresponds to a constituent in which the first shroud 250 moves by the refrigerant flowing through the compressor 200. Also, the gap adjustment member corresponds to a constituent for moving the first shroud 250 in addition to the gap adjusting passage.

The first gap 270 may be effectively adjusted by the movement of the first shroud 250 as described above. Thus, the interference between the impeller and the shroud may be prevented, and also, the leakage of the refrigerant may be prevented.

The turbo compressor including the above-described constituents according to the embodiment may have the following effects.

The flowing refrigerant generated by the driving may be moved to without providing the separate power source to effectively adjust the gap between the impeller and the shroud.

In detail, in the process of stopping the driving of the compressor, the gap between the impeller and the shroud may be widened to prevent the impeller and the shroud from interfering with each other. Thus, each of the components may be prevented from being damaged.

In addition, in the process of driving the compressor, the gap between the impeller and the shroud may be narrowed to prevent the refrigerant from leaking between the impeller and the shroud. Therefore, the compression efficiency may be improved.

Particularly, the shroud may be more efficiently moved by using gap adjustment member coupled to the shroud as well as the gap adjustment passage through which the compressed refrigerant is provided to the shroud.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A turbo compressor comprising:
   a driving shaft;
   a first impeller coupled to a first end of the driving shaft;
   a second impeller coupled to a second end of the driving shaft;
   a first shroud that defines a first compression space accommodating the first impeller;
   a second shroud that is fixed to a predetermined position and defines a second compression space accommodating the second impeller;
   a first-stage outflow passage configured to guide refrigerant discharged from the first impeller;
   a second-stage outflow passage configured to guide refrigerant discharged from the second impeller; and
   a gap adjustment passage that is branched from at least one of the first-stage outflow passage or the second-stage outflow passage and extends to the first shroud,
   wherein the first shroud is configured to move in a first direction relative to the second shroud based on movement of the driving shaft, the first impeller, and the second impeller in the first direction.

2. The turbo compressor according to claim 1, wherein the first impeller and the first shroud define a first gap therebetween,
   wherein the gap adjustment passage extends to one side of the first shroud, and
   wherein the first shroud is configured to, based on refrigerant being supplied to the first shroud through the gap adjustment passage, move in the first direction toward the first impeller to thereby decrease the first gap.

3. The turbo compressor according to claim 1, further comprising:
   a first-stage inflow passage configured to supply refrigerant into the first impeller; and
   a second-stage inflow passage connected to the first-stage outflow passage and configured to supply refrigerant into the second impeller,
   wherein the gap adjustment passage is branched from the second-stage outflow passage and extends to the first shroud.

4. The turbo compressor according to claim 1, wherein the driving shaft extends in an axial direction, and
   wherein the turbo compressor further comprises a guide device configured to guide movement of the first shroud in the axial direction.

\* \* \* \* \*